United States Patent [19]

Wise

[11] Patent Number: 4,755,158

[45] Date of Patent: Jul. 5, 1988

[54] PADDLING GLOVE

[75] Inventor: Vincent K. Wise, Oatley, Australia

[73] Assignee: Tidal Control Pty. Ltd., Commonwealth, Australia

[21] Appl. No.: 905,691

[22] Filed: Sep. 9, 1986

[30] Foreign Application Priority Data

Sep. 16, 1985 [AU] Australia ............................ PH02445

[51] Int. Cl.⁴ ............................................. A63B 31/04
[52] U.S. Cl. ..................................... 441/57; 156/279; 156/292; 156/308.4; 264/305; 441/58
[58] Field of Search ................................... 441/56-58; 223/78; 264/305; 2/168; 156/279, 292, 308.4, 245

[56] References Cited

U.S. PATENT DOCUMENTS

| | | | |
|---|---|---|---|
| 2,004,684 | 6/1935 | Bell | 441/57 |
| 2,016,538 | 10/1935 | Borgman | 441/57 |
| 2,692,995 | 11/1954 | Le Bihan | 441/57 |
| 2,873,450 | 2/1959 | Brodeur, Jr. | 2/168 X |
| 3,023,432 | 3/1962 | Loomis | 441/57 |
| 3,231,910 | 2/1966 | Tegland | 441/57 |
| 3,261,040 | 7/1966 | Olson | 441/57 |
| 4,597,108 | 7/1986 | Momose | 2/168 |

Primary Examiner—Sherman D. Basinger
Attorney, Agent, or Firm—Felfe & Lynch

[57] ABSTRACT

A paddling glove is manufactured by forming a mit in a dip-moulding process and then uniting selected internal surfaces of the mit with selected facing internal to define finger pockets with webs extending therebetween. There is also provided a paddling glove having a web extending between adjacent digit pockets and having a vane which extends from the web towards the palmside of the digit pockets to define a shallow scoop between the web, adjacent digit pockets and the vane so as to improve positive water displacement in use for paddling.

10 Claims, 2 Drawing Sheets

STEP 1: PREPARE HAND-SHAPED MOLD

STEP 2: DIP MOLD INTO WATER

STEP 3: DIP MOLD INTO COAGULANT BATH

STEP 4: SPRAY MOLD WEB PARTS

STEP 5: DIP MOLD INTO LATEX BATH

STEP 6: DIP LATEX COATED MOLD A SECOND TIME INTO LATEX BATH

STEP 7: SPRAY PALM SIDE OF LATEX COATED MOLD WITH FLOCK

STEP 8: APPLY PATCH TO SECURE WRIST STRAPS

STEP 9: DRY LATEX COATED MOLD

STEP 10: SUBMERGE MOLD IN WATER FOR LEACHING

STEP 11: BATH LEACHED MOLD

STEP 12: REMOVE LATEX ARTICLE FROM MOLD

STEP 13: SUBMERGE LATEX ARTICLE INSIDE OUT INTO WATER

STEP 14: TREAT EXPOSED WEB SURFACES OF INSIDE OUT ARTICLE WITH PRIMER AND A HEAT SENSITIVE ADHESIVE

STEP 15: TURN MIT OUTSIDE IN

STEP 16: APPLY HEAT TO UNITE ADHESIVE COATED WEB SURFACES

PADDLING GLOVE

TECHNICAL FIELD OF THE INVENTION

This invention relates to a glove which is of assistance for paddling.

BACKGROUND ART

It is well known to use flippers to aid swimmers by increasing the area used for propulsion by the feet. This concept has been extended to provide webbed gloves for swimmers' hands. Such aids have been found particularly useful for young children when first learning to swim in that they improve the propulsion efficiency of the hands and thus provide greater confidence in young swimmers.

Known webbed gloves comprise flat membranes extending between adjacent finger pockets of the glove. The web typically is joined to the finger pockets on a line mid-way between the palm and back edge of the finger pocket as described in Australian patent application No. 85764/75 or is joined to the finger pockets so as to be flush with the palm edges of the finger pocket as described in Australian patent application No. 42461/78 or Petty Pat. No. 28423/84. Much of the water displaced when the glove is dragged through the water escapes over the finger tip end of the webbing. This problem has been obviated in the past by cupping the hand while swimming. However, cupping results in buckling of the webbing and escape of displaced water. Furthermore, as the hand when displaced displaces much more water than when extended, it becomes difficult for the swimmer to hold his hand in a cupped position with fingers apart for any length of time without his hand and wrist muscles tiring.

To overcome muscle strain it has been proposed to provide gloves which may be cupped and which are reinforced against bending towards an uncupped direction. However such gloves have been of complex and costly construction and have not achieved wide use. Even when the hand is not cupped, a further problem is that the force exerted by water on the web tears the web, especially at the join with the fingers. In order to provide a sufficiently robust article, webbed gloves have hitherto been manufactured by press moulding and having a thick web.

It is an object of the present invention to provide a webbed paddling glove which provides increased positive water displacement without requiring the hand of the swimmer to be cupped.

Another object is to provide an improved method of manufacture of a paddling or swimming glove.

DISCLOSURE OF THE INVENTION

According to one aspect, the present invention consists of a paddling glove comprising a hand compartment defining a palm side and a back side of the glove, at least two adjacent digit pockets, a web extending between said pockets, and characterized in that the web includes a vane portion which in use extends from the web towards the palm side of the digit pockets whereby to define a shallow scoop between the web, the adjacent finger pockets and the vane portion.

In preferred embodiments, the web extends between adjacent digits in a plane at or near the back side of the digit pockets, the vane is integral with the web, and curls from the web at or near the backside of the fingertips to the palm side of the fingertips.

The term "digit" as herein used means a thumb or finger and for preference a web and a vane are provided between each adjacent pair of digits.

Preferably, the glove is made of flexible resilient material such as rubber or plastic and is provided with a strap arrangement around the wrist to prevent accidental removal of the glove.

According to a second aspect the invention consists in method of manufacture of a webbed paddling glove comprising the steps of:

(1) forming a mit by a moulding process,
(2) uniting selected internal surfaces of the mit with facing internal surfaces, said united surfaces being selected so as to define digit pockets with webs extending therebetween.

It is strongly preferred that a layer of flock be applied to one or both of the interior web surfaces of the article either by spraying flock onto the web surfaces of the mould or by application to the corresponding surfaces of the article as exposed on initial demoulding. The flock has been found to prevent the palm side web portion from delaminating from the back side web portion of the finished glove.

BRIEF DESCRIPTION OF THE DRAWINGS

A preferred embodiment of the invention will now be described with reference to the accompanying drawings, in which:

FIG. 4 is a flow diagram illustrating the steps of the invention process of making the paddling glove.

DESCRIPTION OF PREFERRED EMBODIMENTS OF THE INVENTION

Figure 1:
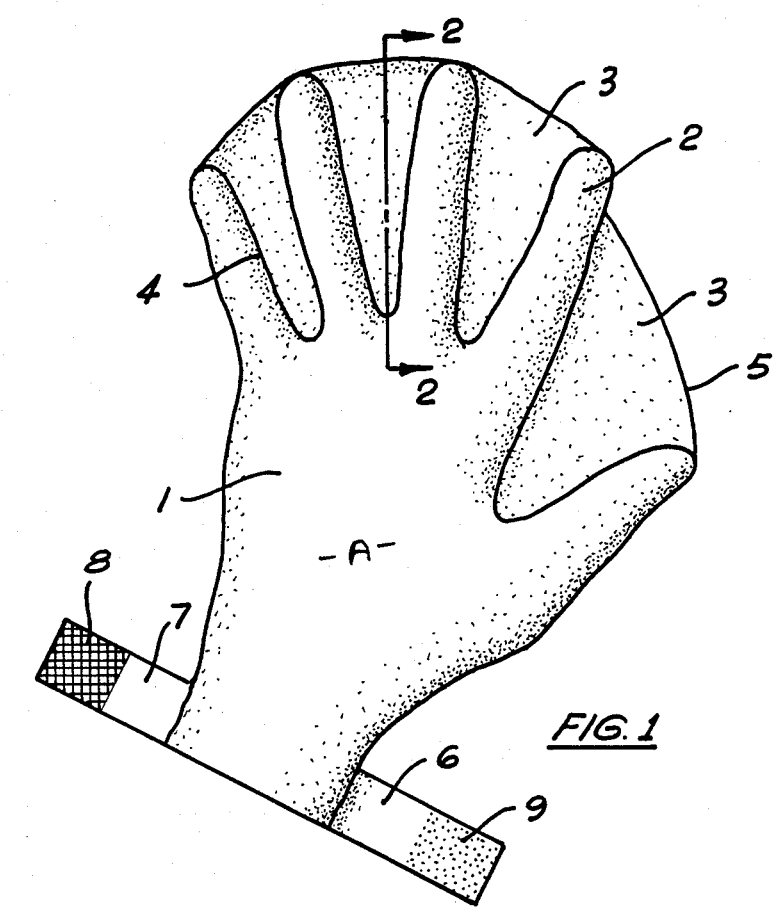
FIG. 1 is a plan view of the back of a paddler's glove according to the invention.

Referring to the drawings, FIG. 1 shows a left-hand glove with a hand compartment 1 having a back side "A". The palm side "B" is not visible in FIG. 1. Extending from hand compartment 1 are 5-digit pockets 2, each having a back surface, a palm surface, and sides 4.

Figure 2:
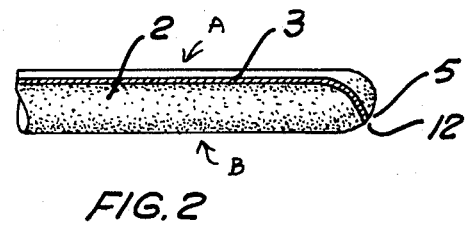
FIG. 2 is a side elevation section taken along line 2—2 of FIG. 1.

A web 3 extends between each pair of adjacent finger sides 4. In the preferred embodiment, web 3 is substantially coplanar with the back of the hand and of the fingers, except at the distal edge of each web where the web merges into a downwardly curving vane 5. Vane 5 is more clearly visible in FIG. 2 which shows a cross-sectional view taken on line A—A of FIG. 1. Web 3 joins the back surfaces of finger pockets 2 and vane 5 curls downwardly from web 3 to free edge 12 which is near the palm side of the finger tips. This downward curling vane 5 in co-operation with web 3 joining at the back surface of adjacent finger pockets 2 forms a shallow scoop shape which provides a much improved positive water displacement. The curled vane 5 co-operates with web 3 and finger pockets 2 to give a cupping effect which reduces the escape of water over the free edge 12 of the vane as the hand is pulled through the water, without requiring the wearer's hand to be cupped.

Two flexible rubber strips 6 and 7 are attached to the sides of the glove at the wrist preferably by means of a similar adhesive to that used in forming the web as described hereinafter. Alternatively, a single strip may be attached to the wrist part of the glove and extending on either side thereof to provide strips 6 and 7. The free ends of strips 6, 7 are provided with "velcro" type attachments 8 and 9 so that the length of the strap can be readily adjusted to the wrist size of the wearer. It will be readily appreciated by those skilled in the art that other attachments such as press studs, buttons, clips, buckles and the like may be used to provide an adjustable wrist strap.

A preferred embodiment of a manufacturing method according to the invention will now be described.

The article is manufactured by a coagulation dipping process. A hand-shaped solid mould having splayed-apart fingers and having a web connected between a pair of adjacent fingers is used. Preferably the mould has a shape similar to the glove shown in FIG. 1 with a web between each pair of adjacent digits, with straps 6, 7 omitted, and including vanes 5 at the free end of the web.

The mould is first dipped into water to wet its surfaces and then is dipped into a bath of coagulant of the type commonly used in the art for making gloves from a rubber latex. The mould is removed from the coagulant and allowed to drain. The web parts of the mould are next sprayed with a flock or chopped fibres which sticks to the coagulant coating the mould.

Then the mould is dipped into a bath containing a latex which is preferably a pure natural rubber latex.

The mould is removed from the latex bath and allowed to drain. The latex coated mould is then dipped a second time to cover holes in the latex film, if any, caused by the flock. After the second dipping the mould is removed from the bath and again allowed to drain.

The outside palm side of the latex coating is then sprayed with flock, a patch is applied at the wrist for securing the straps, and the latex is allowed to dry to form a rubber article.

After drying, the article still on the mould is submerged in water for a period for leaching and then is placed in an oven for drying. The article is then removed from the mould by turning the article inside-out. It will be appreciated that at this stage the article is generally mit-shaped and does not have segregated finger pockets which are closed along the finger edges.

The inside-out moulded mit-like article is again submerged in water and then dried.

The outwardly exposed web surfaces of the inside-out article are next selectively treated with a primer and a heat-sensitive adhesive.

The article is next turned outside-in, bringing selectively adhesive-coated surfaces of the web into facing relationship.

Heat is applied causing the adhesive to unite the facing parts of the web together, and thereby to form finger pockets in between adjacent webs.

Finally straps may be adhered to the patch at the wrist.

In the finished article, the web is thus a laminate including a palm side web and a back side web having a flock and adhesive therebetween.

The flock fibres which were applied to the mould surface are, in the finished article, anchored to an interior web surface and embedded in adhesive between the palm side of the web and the back side of the web. The fibres are effective to anchor the web surfaces to each other and to prevent or reduce delamination of the web parts in use.

Figure 3:
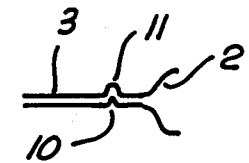
FIG. 3 shows an enlarged cross-sectional view of the finger edge portions of another embodiment of a glove according to the invention.

When liquid adhesives are applied to the interior web parts of the mit adhesive may escape into the finger pockets on compression of the web parts resulting in poor joints and possible sealing of finger pockets. To avoid that problem a ridge can be formed along the interior finger edges of each web, the ridge serving to retain the adhesive within the web area. FIG. 3 shows one arrangement whereby a fluid adhesive may be contained. A ridge 10 is provided along the finger pocket edge 4. This edge mates with an aligned depression 11 to form a sealing join to prevent escape of adhesive from between the webs 3 into the finger pocket 2. Other arrangements such as an upstanding rib on one part could also be used. However, if heat or pressure sensitive adhesives are used, adhesive retention is generally not a problem.

The glove desirably includes a flocked outer palm side to assist in gripping when using the glove. In other embodiments, grip can be assisted by treating the surface of the finished glove to produce a rough surface or the mould itself can be designed with a rough surface such that the glove produced has a non-slip surface.

In a preferred embodiment the thumb pocket is formed to be at a downward angle in relation to the plane of the extended fingers. This provides for a slight natural cupping effect when the glove is worn as the thumb in the normal relaxed state extends downward from the plane of the fingers.

It is not necessary for the paddling glove of the present invention to comprise a whole glove which conventionally covers all of the surface of the hand; both the palm and the back of the hand may be left in part uncovered in which cases the digit pockets are preferably joined to the wrist by straps or the like.

Although gloves according to the invention have been found useful for young swimmers they are particularly advantageous for use by surf board riders when the rider's hands are the main means of propulsion. The improved efficiency provided by gloves of the invention greatly increase the paddling ability of surf-board riders.

It will be understood by those in the art that other embodiments and modifications of invention are possible without departing from the spirit or scope of invention described.

I claim:

1. A method for manufacture of a paddling glove comprising the steps of: coating with a suitable film forming material a generally hand-shaped mould having adjacent digits connected by a web, whereby to form a pliable article on the mould;

demoulding the article by turning it inside out;

applying an adhesive selectively to exposed surfaces of the inside out article which prior to demoulding were adjacent the web; and turning the article outside in and causing said selected surfaces to unite with facing interior surfaces whereby to form webs defining digit pockets therebetween.

2. A method according to claim 1 wherein a flock or other fibres are anchored to said selected surfaces prior to said step of uniting.

3. A method according to claim 1 further including the step of applying a flock to the webbed surface of the mould prior to coating with film forming material.

4. A method according to claim 3 wherein the step of coating comprises dipping the mould in, or spraying the mould with, a rubber latex.

5. A method according to claim 1 wherein the selected facing interior web parts are united with a heat sensitive adhesive.

6. A method according to claim 1 including the step of applying a flock to the exterior palm side of the finished article.

7. A paddling glove, comprising:
- a hand compartment defining a palm side and a back side of the glove;
- at least one finger pocket substantially extending in a planar direction relative to the palm side;
- a thumb pocket adjacent to said finger pocket and extending in a downward angle toward the palm side relative to the finger pocket; and
- a web extending between said finger and said thumb pockets comprising a vane portion extending from the web towards the palm side of the finger and thumb pockets, thereby defining a shallow scoop between the web, the finger pocket, the thumb pocket and the vane portion said web being substantially planar along said finger and thumb pockets and curving downwardly at an outer edge so as to form said vane portion.

8. A glove according to claim 7 wherein the web extends between the back side of the adjacent finger and thumb pockets and the vane extends from the back side of the adjacent finger and thumb pockets to the palm side.

9. A glove according to claim 7 wherein the vane is at or adjacent the free end of the finger and thumb digit pockets.

10. A glove according to claim 7 having a web and vane between each pair of finger pockets and between the finger pocket and thumb pocket.

* * * * *